(12) United States Patent
Wyganowski et al.

(10) Patent No.: US 7,752,596 B2
(45) Date of Patent: Jul. 6, 2010

(54) CONNECTING ALTERNATIVE DEVELOPMENT ENVIRONMENT TO INTERPRETIVE RUNTIME ENGINE

(75) Inventors: Jaroslaw Wyganowski, Fargo, ND (US); Andrew Ingalls, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 1146 days.

(21) Appl. No.: 11/378,180

(22) Filed: Mar. 17, 2006

(65) Prior Publication Data

US 2007/0220478 A1 Sep. 20, 2007

(51) Int. Cl.
*G06F 9/44* (2006.01)
(52) U.S. Cl. ........ 717/100; 719/328
(58) Field of Classification Search ........ 717/100; 709/328
See application file for complete search history.

(56) References Cited

U.S. PATENT DOCUMENTS

| | | | |
|---|---|---|---|
| 5,557,798 A | 9/1996 | Skeen et al. | 705/35 |
| 6,209,040 B1 | 3/2001 | Acton et al. | 719/315 |
| 6,321,374 B1 | 11/2001 | Choy | 717/106 |
| 6,381,734 B1 | 4/2002 | Golde et al. | 717/1 |
| 6,640,231 B1* | 10/2003 | Andersen et al. | 1/1 |
| 7,461,385 B2* | 12/2008 | Winter | 719/328 |
| 2002/0016954 A1* | 2/2002 | Charisius et al. | 717/2 |
| 2002/0108102 A1* | 8/2002 | Muhlestein et al. | 717/124 |
| 2002/0116485 A1* | 8/2002 | Black et al. | 709/223 |
| 2003/0105887 A1 | 6/2003 | Cox et al. | 719/328 |
| 2003/0172196 A1* | 9/2003 | Hejlsberg et al. | 709/328 |
| 2004/0006762 A1* | 1/2004 | Stewart et al. | 717/106 |
| 2004/0073913 A1 | 4/2004 | Fairweather | 719/328 |
| 2004/0103405 A1* | 5/2004 | Vargas | 717/137 |
| 2004/0163091 A1* | 8/2004 | Brill | 719/328 |
| 2004/0177335 A1 | 9/2004 | Beisiegel et al. | 717/102 |
| 2004/0181797 A1 | 9/2004 | Chang et al. | 719/328 |
| 2004/0268301 A1* | 12/2004 | Kaston | 717/108 |
| 2005/0198649 A1* | 9/2005 | Zakonov | 719/318 |
| 2005/0259653 A1* | 11/2005 | Reuveni | 370/389 |
| 2006/0041890 A1* | 2/2006 | Pik et al. | 719/315 |
| 2007/0038986 A1* | 2/2007 | Houser | 717/151 |
| 2007/0074192 A1* | 3/2007 | Geisinger | 717/148 |
| 2007/0169017 A1* | 7/2007 | Coward | 717/136 |

OTHER PUBLICATIONS

Dennis Strein et al., Design and Implementation of a hight-level multi-language .NET debugger, 2005, (Strein.pdf), pp. 8.*

Strein, D. et al.; "Design and Implementation of a High-Level Multi-Language .Net Debugger", Permission from .NET Technologies 2005, conf. Proceedings, original date not known, 8 pgs.

(Continued)

*Primary Examiner*—Wei Y Zhen
*Assistant Examiner*—Hiren Patel
(74) *Attorney, Agent, or Firm*—Westman, Champlin & Kelly, P.A.

(57) ABSTRACT

An application program interface (API) links an interpretive runtime engine to an alternate application development environment. The API includes a generic API layer that is configured to translate an output from the alternate application development environment into a corresponding signal that is recognizable by the interpretive runtime engine. The API also includes a dictionary-specific API layer that is configured to represent a dictionary associated with the interpretive runtime engine in an alternate format that is consistent with operation within the alternate application development environment.

18 Claims, 6 Drawing Sheets

OTHER PUBLICATIONS

David, O. et al.; "Metadata and Modeling Frameworks: The Object Modeling System Example," Colorado State Univ. Ft. Collins, CO., original date not known, 5 pgs.

D. Keppel. "A Portable Interface for On-The-Fly Instruction Space Modification" Dept. Of Computer Science and Engineering, date unknown, pp. 86-95.

* cited by examiner

CONNECTING ALTERNATIVE DEVELOPMENT ENVIRONMENT TO INTERPRETIVE RUNTIME ENGINE

BACKGROUND

An interpretive runtime engine will typically include application code that resides in one or more dictionaries. It is conceivable that it may be desirable for a developer operating from within a different application development environment to take advantage of the functionality of the runtime engine and/or its associated dictionary. For example, it may be desirable for a developer operating from within a managed code application development environment to take advantage of such functionality.

Taken from the perspective of a developer operating from outside of the interpretive runtime engine environment, it may not be a simple undertaking to interact with or through the runtime engine. For example, the developer may not be familiar with many details related to the engine and/or its dictionaries. Such details might include information related to parameter formatting, syntax formatting, applicable data types, semantic processing, etc.

Further, the runtime engine is likely to expose application program interfaces that are difficult for "outsiders" to grasp or anticipate. Type information reflected in an application dictionary associated with the runtime engine may not be reflected in the interfaces associated with the engine itself. Thus, a programmer is forced to know names of forms, windows and fields within a dictionary to start writing integration code.

The discussion above is merely provided for general background information and is not intended for use as an aid in determining the scope of the claimed subject matter. Further, it should also be emphasized that the claimed subject matter is not limited to implementations that solve any or all of the disadvantages of any currently known systems noted in this section.

SUMMARY

An application program interface (API) links an interpretive runtime engine to an alternate application development environment. The API includes a generic API layer that is configured to translate an output from the alternate application development environment into a corresponding signal that is recognizable by the interpretive runtime engine. The API also includes a dictionary-specific API layer that is configured to represent a dictionary associated with the interpretive runtime engine in an alternate format that is consistent with operation within the alternate application development environment.

This Summary is provided to introduce, in a simplified form, a selection of concepts that are further described below in the Detailed Description. This Summary is not intended to identify key features or essential features of the claimed subject matter, nor is it intended for use as an aid in determining the scope of the claimed subject matter.

DETAILED DESCRIPTION

Figure 1:
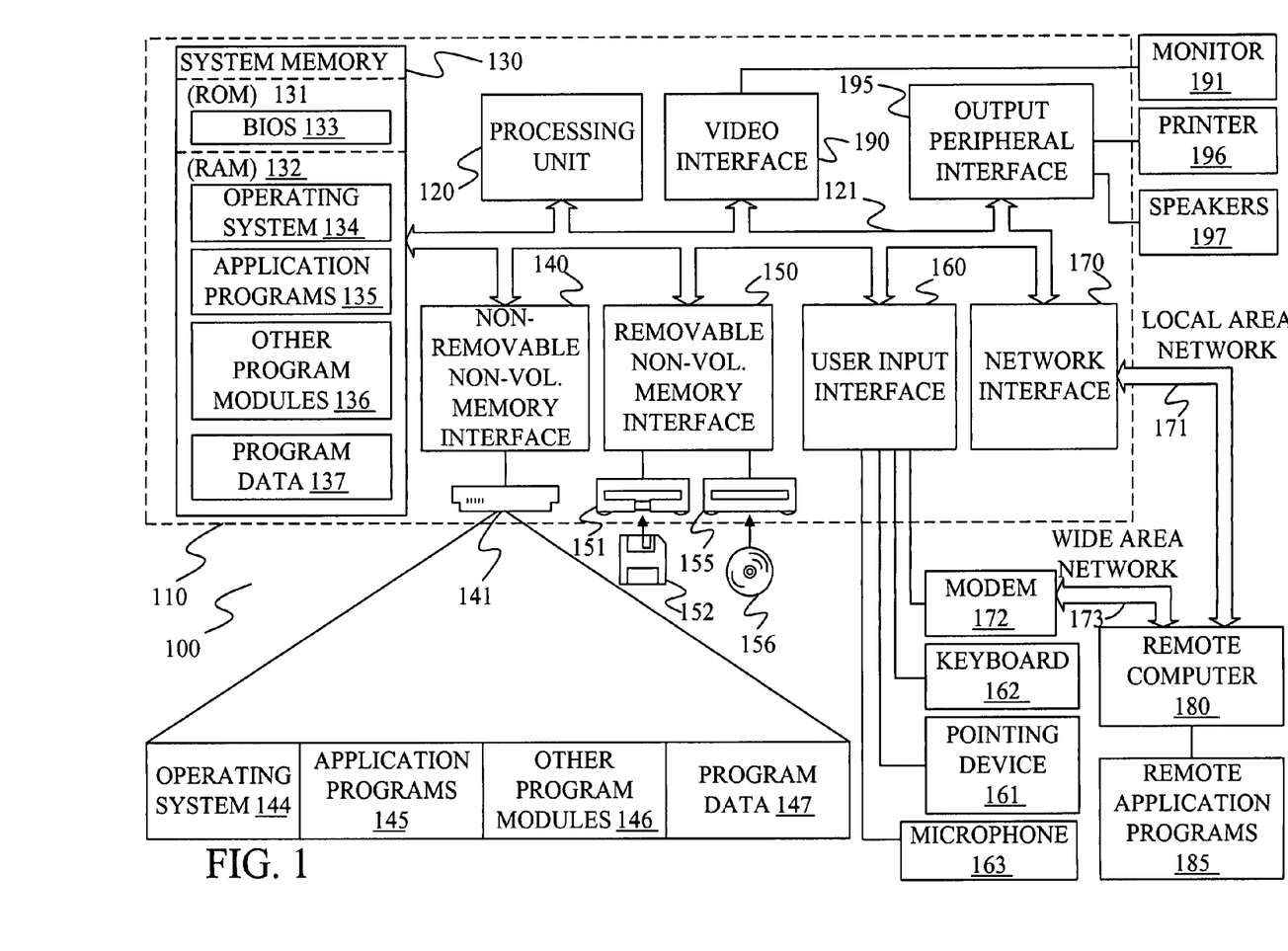
FIG. 1 is a block diagram of one computing environment in which some embodiments may be practiced.

FIG. 1 illustrates an example of a suitable computing system environment 100 in which embodiments may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
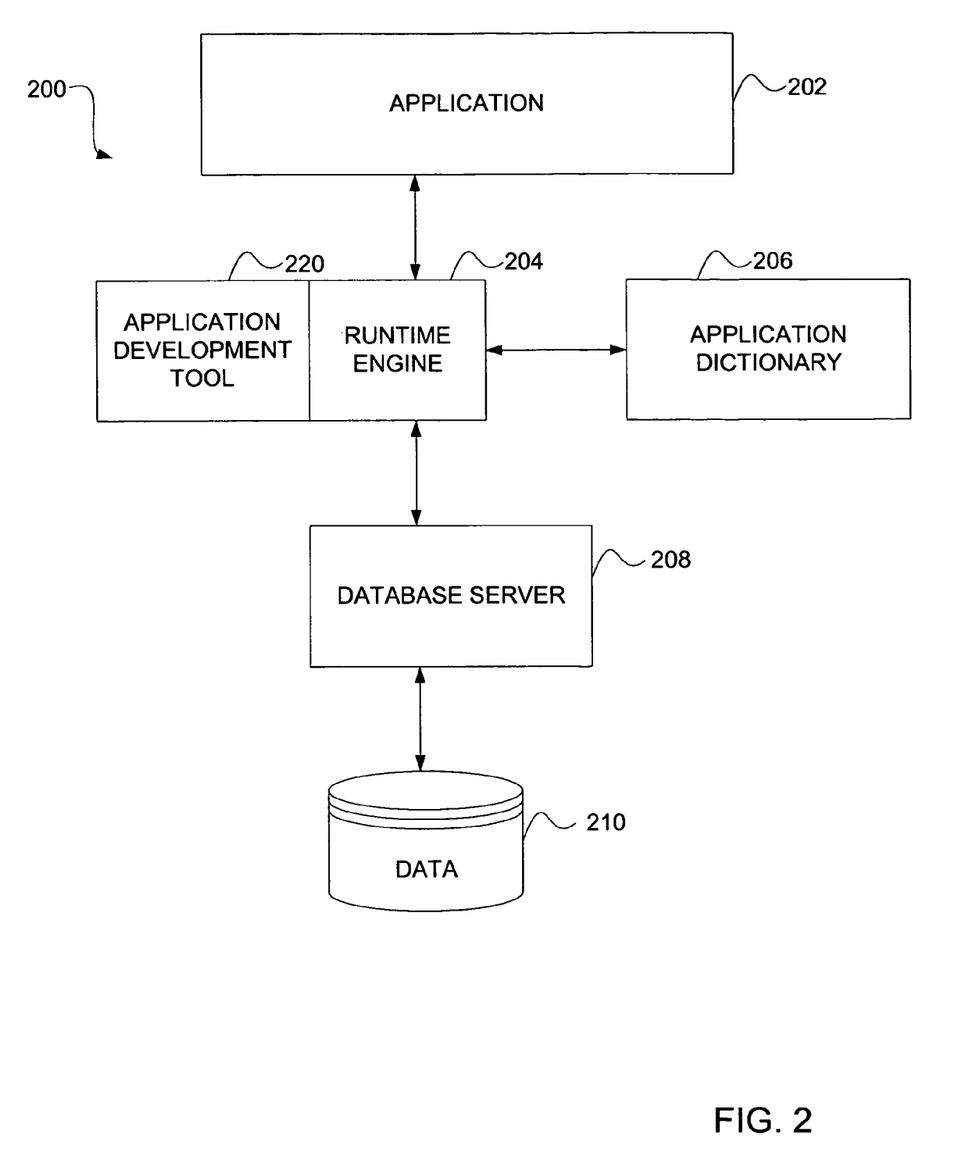
FIG. 2 is a schematic block diagram of an application environment.

FIG. 2 is a schematic block diagram of an application environment 200. Environment 200 includes an application 202, a runtime engine 204, an application dictionary 206, a database server 208 and data 210. In some instances, as might be the case for a single-user installation, all of the illustrated components may be installed on a single computing device (e.g., a single workstation). However, the components may alternatively be distributed. For example, for multi-user installations, runtime engine 204 and application dictionary 206 may be installed on individual computing devices. In this latter case, a separate server may be configured to manage data for the system. Of course, this is but one of many combinations of distribution that should be considered within the scope of the present invention.

Database server 208 is configured to store and manage data 210 for application 202. In one embodiment, not by limitation, server 208 is an implementation of Microsoft® SQL Server offered by Microsoft Corporation of Redmond Wash. Data 210 illustratively includes data stored in a relational database system. Of course, any other database scheme could be deployed without departing the scope of the present invention.

An application development tool 220 is shown in connection with runtime engine 204. These components are shown together because they may be separate or one might encompass the other. Development tool 220 is illustratively a programming tool utilized by a developer to create application 202. It is illustratively the runtime engine 204 that presents application 202 to the end-user.

In one embodiment, but not by limitation, development tool 220 and runtime engine 204 are standard Windows® applications developed using Microsoft® Visual C++®. In one embodiment, not by limitation, application development tool 220 is the Dexterity® development tool, which is a software product offered by Microsoft Corporation of Redmond, Wash. In another embodiment, runtime engine 204 is the runtime engine offered in conjunction with the Dexterity® development tool.

In one embodiment, not by limitation, application development tool 220 provides an integrated application development environment. Features can include, but certainly are not limited to, a graphical forms designer, a scripting language used to add business logic to the application, a function library, an integrated script debugger, a built-in mechanism for exception handling, COM support, integrated source code control, and a built-in report writer. Any combination of these or other features can be incorporated without departing the scope of the present invention.

Runtime engine 204 illustratively provides basic capabilities used by application 202, such as, but not limited to, the subsystems to display a user interface or access data 208 through a database server 208. Runtime engine 208 can also be configured to provide any additional tools and technology to be taken advantage of by application 202. Runtime engine 204 can be configured to support or handle any or all of the functions listed above as being within the capacity of the application development tool.

Application dictionary 206 illustratively contains resources and business logic for application 202. Separating the business logic from the application presentation helps insulate the application from technology changes. The internal structure of the application dictionary illustratively enables users to perform certain tasks without affecting the application's business logic.

The architecture of application environment 200 is illustratively extensible at least in that the runtime engine is configured to support implementation of multiple dictionaries. This multi-dictionary architecture makes it possible for multiple applications created with application development tool 220 to be run at the same time. In one embodiment, this enables multiple applications to function together, for example, appearing as a single application to a user.

Figure 3:
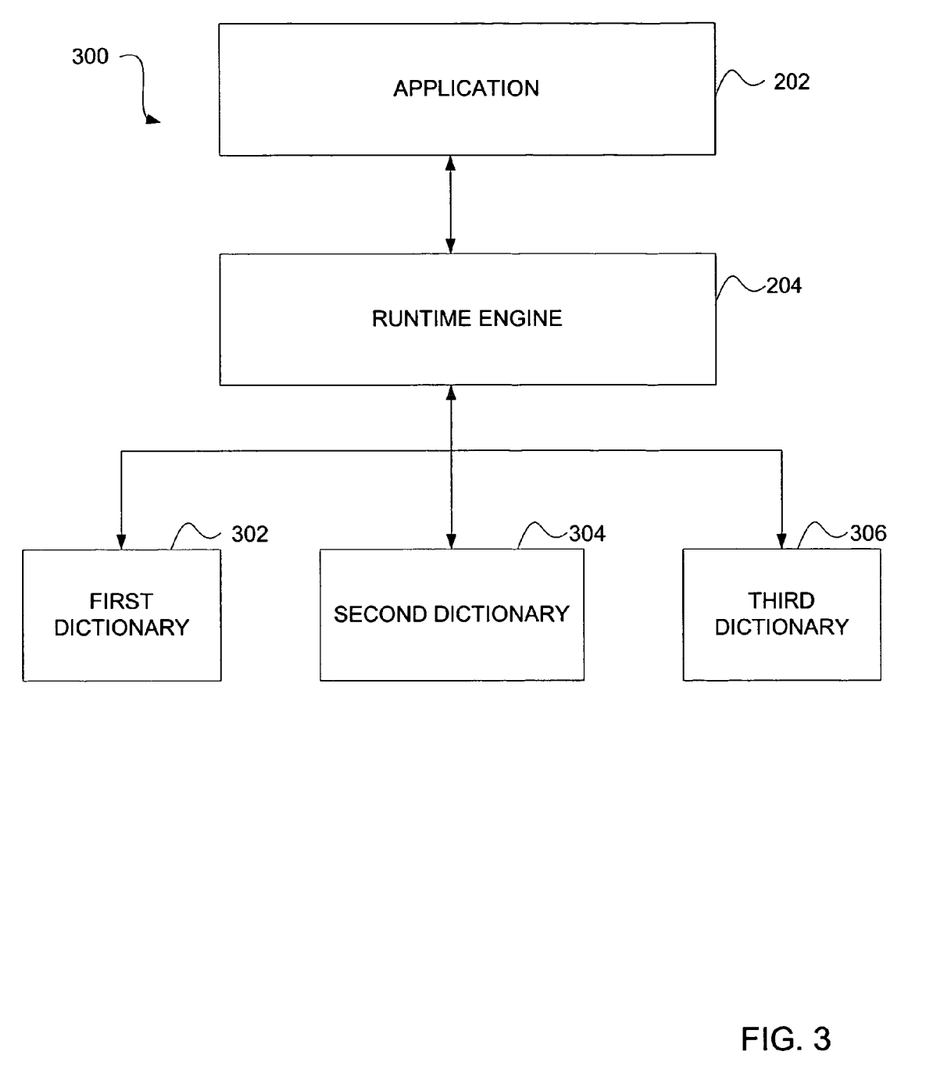
FIG. 3 is a schematic block diagram of an application environment.

FIG. 3 is a schematic block diagram of an application environment 300 that also includes an application 202 and a runtime engine 204. It is to be understood that the components of environment 200 that are not in FIG. 3 could just as easily be implemented as part of environment 300. FIG. 3 is a simplified diagram intended for illustrative purposes only.

As is shown in FIG. 3, instead of a single dictionary, runtime engine 204 is configured to implement multiple dictionaries, namely dictionaries 302, 304, and 306 (it is to be understood that actual implementation might include any number of dictionaries) that function together in a multi-dictionary environment. In one embodiment, not by limitation, at least one of the dictionaries is a core application dictionary, for example, a core related to application 202 (e.g., a core dictionary configured to support implementation of a comprehensive business management solution). One or more other dictionaries might be an integrating application dictionary (e.g., a human resources dictionary, a manufacturing dictionary, etc.). An integrating dictionary might use resource from the core dictionary or vice versa.

Figure 4:
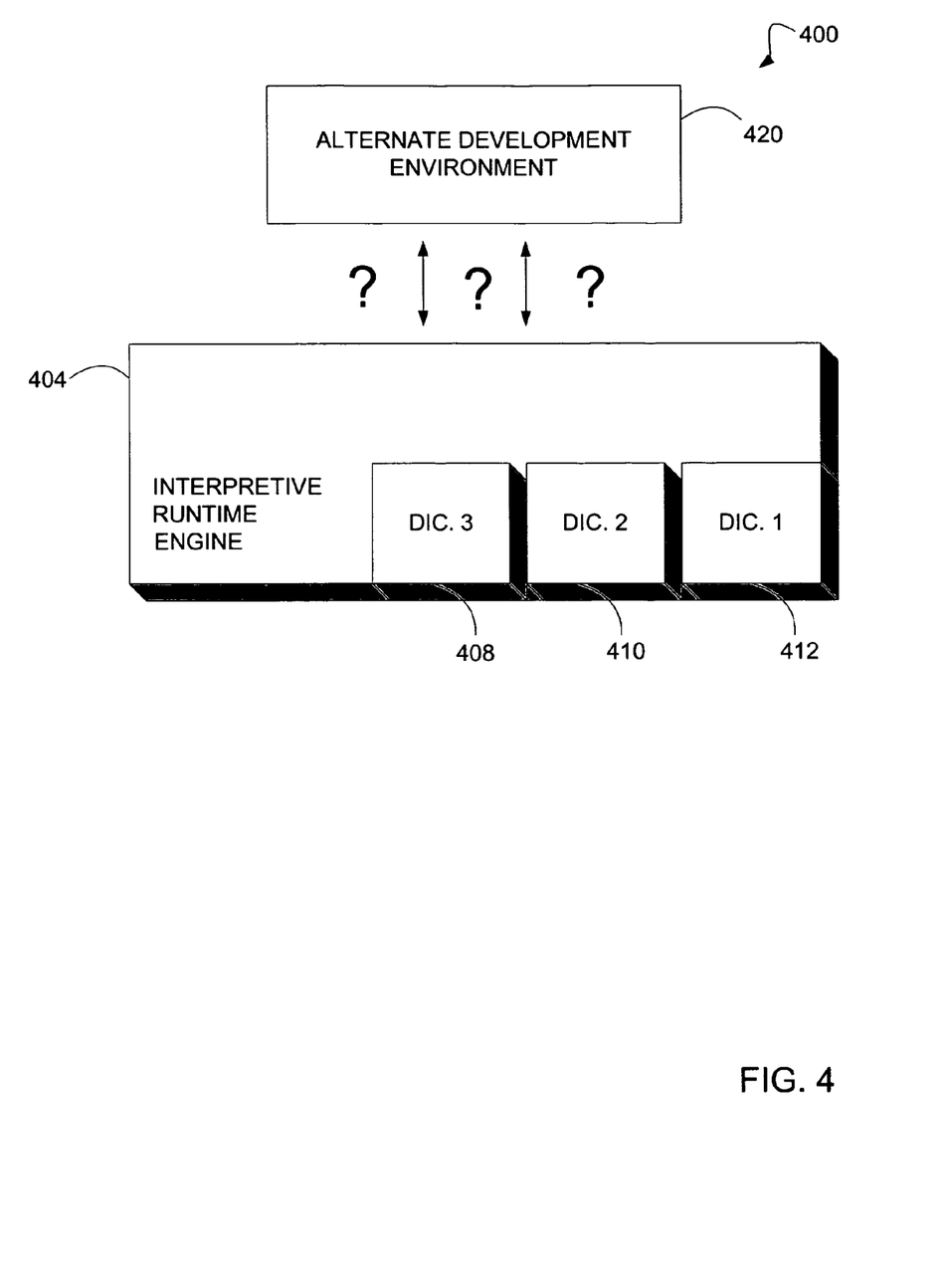
FIG. 4 is a schematic block representation of an application development environment.

FIG. 4 is a schematic representation of an application development environment 400. Block 404 represents a software layer that is configured to serve as an interpretive runtime engine. Runtime engine 404 may correspond to, for example, runtime engine 204 as illustrated in application environments 200 and 300. That being said, engine 404 could be any implementation of an interpretive runtime engine.

Runtime engine 404 includes binaries and application code that resides in one or more dictionaries that, within FIG. 4, have been identified for the purpose of illustration as dictionaries 408, 410 and 412. Dictionaries 408, 410 and 412 may correspond to, for example, dictionaries 206, 302, 304 and/or 306 shown in application environments 200 and 300. That being said, those skilled in the art will appreciate that other implementations of dictionaries are to be considered within the scope of the present invention.

Box 420 represents an alternate application development environment 420. Assumedly, interaction with the interpretive runtime engine 404 (and/or its related dictionaries 408, 410 and 412) through the vehicle of the alternate development environment 420 is not a simple process from the perspective of a developer operating from within environment 420. For example, a developer operating from within environment 420 may not be familiar with many details related to the engine and/or its dictionaries. Such details might include information related to parameter formatting, syntax formatting, applicable data types, semantic processing, etc.

In one embodiment, the alternate development environment 420 is, generally speaking, the Microsoft® .NET Framework, more commonly known as simply the .NET Framework. The .NET Framework is a software development platform created by Microsoft Corporation of Redmond, Wash. The .NET Framework is the Microsoft Web services strategy to connect information, people, systems and devices through software. Integrated across the Microsoft platform, .NET technology provides the ability to quickly build, deploy, manage, and use connected, security-enhanced solutions with Web services.

In order to provide a specific example of the dilemma demonstrated by FIG. 4, and certainly not by limitation, it will be assumed that runtime engine 404 is the Microsoft Dexterity development tool and the alternative development environment 420 is the Microsoft .NET platform. Interaction with the Dexterity software through execution of a set of dictionaries from the .NET environment presents major challenges. Dexterity exposes C language application program interfaces (APIs) that are difficult for an average business application developer to grasp. Type information from an application dictionary is not reflected in the API. Thus, a programmer is forced to know names of forms, windows and fields within a dictionary to start writing integration code. Further, type check is typically performed at runtime, which makes it error prone. With some potential tools that might encompass the dictionary type information, there is still an issue with upgradeability and customization of an existing program. An ideal tool would not introduce redundant dependencies that are not self-correcting during an upgrade or customization process.

Figure 5:
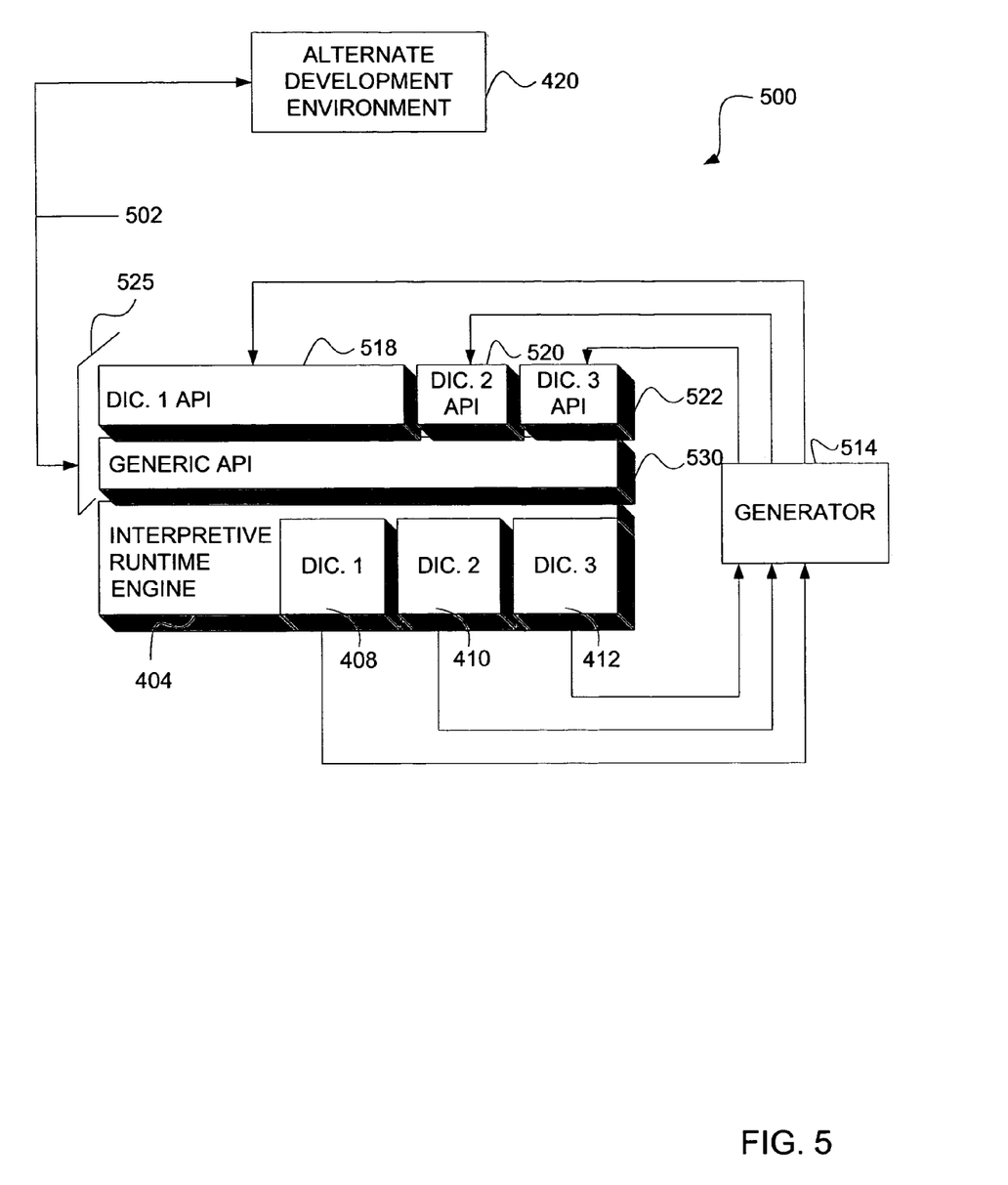
FIG. 5 is a schematic block representation of an application development environment.

FIG. 5 is a schematic representation of an application development environment 500. Environment 500 again includes runtime engine 404 (and its related dictionaries 408, 410 and 412) and an alternate development environment 420. In this case, however, additional software API layers 525 have been added. API layers 525 illustratively enable a developer operating from within environment 420 to take advantage of the functionality of runtime engine 404 (and its associated dictionaries) in a manner that is consistent with what one operating in environment 420 would expect.

Figure 6:
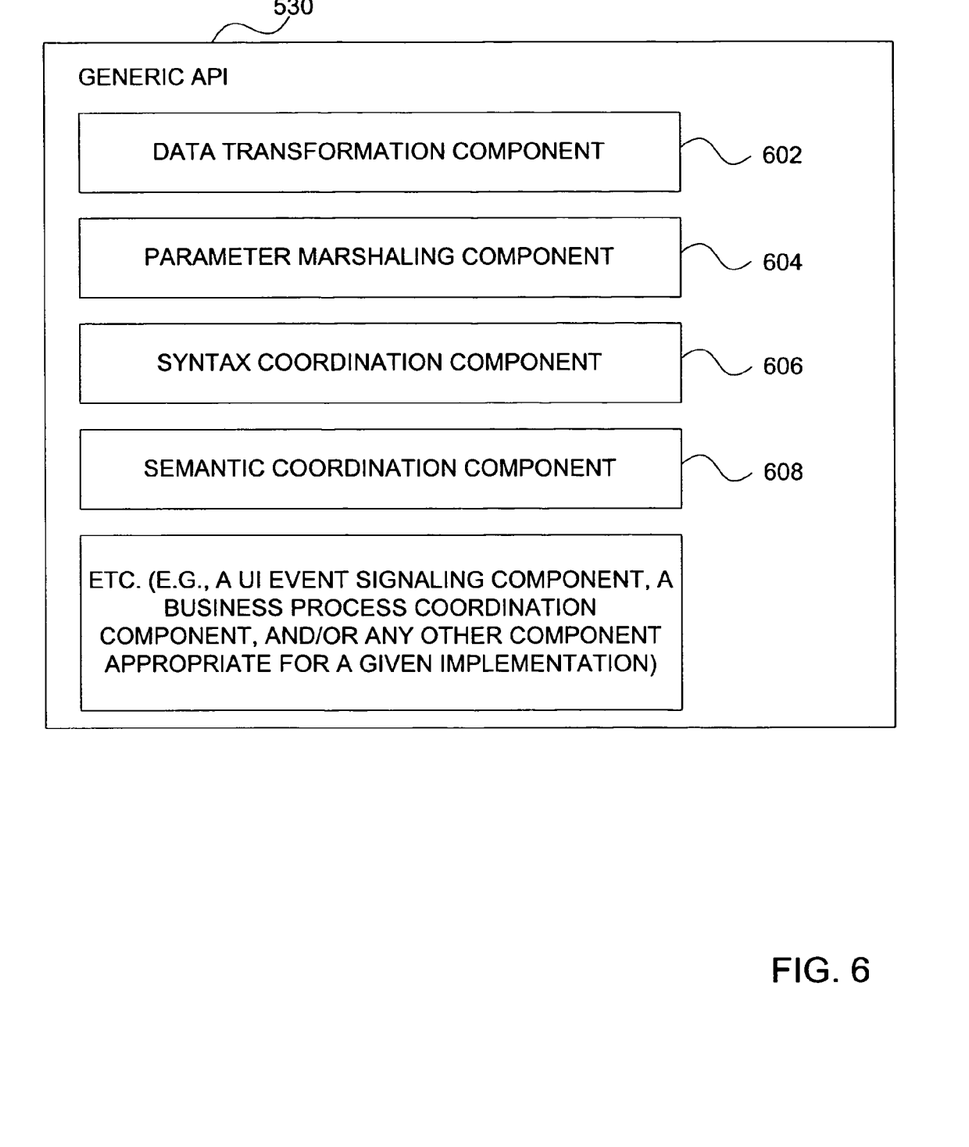
FIG. 6 is a block representation of generic application program interface.

Software layer 530 is illustratively a generic API layer that, on a general level, operates as a bridge between functionality associated with the runtime engine 404 and functionality associated with alternate development environment 420. FIG. 6 is a block representation of generic API 530. The block representation in FIG. 6 includes indications of specific examples of components configured to perform specific functions. Those skilled in the art will appreciate that the actual components and functionality of the generic API layer 530 will be dependent upon the details of runtime engine 404 and development environment 420.

With reference to FIG. 6, generic API 530 includes a data transformation component 602. Component 602 illustratively supports a mapping (or other similar means for supporting transformation) of data types associated with environment 420 to corresponding data types associated with runtime engine 404. In the example where environment 420 is the .NET framework and engine 404 is the Dexterity development tool, data transformation component 602 illustratively supports a mapping of a .NET data type to a corresponding Dexterity data type. For example, an integer in .NET may translate to a different data type in the context of Dexterity. The mapping may go in both directions (e.g., mapping of a Dexterity data type to a corresponding .NET data type) as necessary to support cross-platform processing. Of course, this is but one example of the kind of data transformation that component 602 can be configured to facilitate.

Generic API 530 also includes a parameter marshaling component 604. Component 604 is illustratively configured to coordinate parameter transfers between environment 420 and runtime engine 404. Again assuming the .NET/Dexterity example, a given set of parameters might come into API 530 from the Dexterity tool (i.e., engine 404) in the form of A, B and C. A corresponding procedure associated with the .NET framework might instead be configured to expect parameters in the form of 1, 2 and 3. Component 604 is illustratively configured to, as necessary to support cross-platform functionality, transform the ABC parameter set into a 123 parameter set, and back again if necessary. Of course, this is but one example of the kind of parameter marshaling that component 604 can be configured to facilitate.

Generic API 530 also includes syntax coordination component 606. Component 606 is illustratively configured to coordinate syntax modifications as necessary to support cross-platform processing between environment 420 and runtime engine 404. Again assuming the .NET/Dexterity example, there is illustratively a specialized syntax for accessing the functionality of the Dexterity tool and for accessing the internal structures of the associated dictionaries. Component 606 is illustratively configured to accept a call from the .NET framework and then respond by transforming that call into a syntax appropriate for getting appropriate corresponding activity to occur in the context of the Dexterity tool (or associated dictionaries). Of course, this is but one example of the kind of syntax transformation that component 606 can be configured to facilitate.

Generic API 530 also includes semantic coordination component 608. Component 608 is illustratively configured to coordinate semantic modifications as necessary to support cross-platform processing between environment 420 and runtime engine 404. Again assuming the .NET/Dexterity example, the .NET Framework is configured to handle errors as "exceptions" without really providing for return codes. In contrast, depending on the particular circumstances, the Dexterity tool may implement either return codes or exceptions. Component 608 is illustratively configured to, when appropriate, change a return code into an exception or change an exception into a return code. Of course, this is but one example of the kind of semantic transformation that component 608 can be configured to facilitate.

It should again be emphasized that the actual components and functionality of the generic API layer 530 will be dependent upon the details of runtime engine 404 and development environment 420. In general, the purpose of API layer 530 is to map concepts reflected in runtime engine 404 to corresponding concepts reflected in alternate development environment 420, and to perform translations, transformations, and other manipulations as necessary to support cross-platform processing. On an even higher level, the purpose of API layer 530 is to enable a developer operating within an alternate development environment 420 to interact with runtime engine 404 in a manner that is intuitive and consistent with the developer's previous experiences within the environment 420.

Thus, the generic API 530 essentially serves as a bridge that links the functionality of environment 420 with the functionality of runtime engine 404. However, the experience of a developer who desires to take advantage of the functionality of runtime engine 404 from within environment 420 will be even more intuitive if there is also a similar link between environment 420 and the dictionaries associated with runtime engine 404.

Referring to FIG. 5, a generator 514 is provided to assist in creating the link to the dictionaries and their associated functionality. Generator 514, illustratively a software component, is configured to generate APIs 518, 520 and 522, which respectively correspond to dictionaries 408, 410 and 412. Thus, a developer that operates from within environment 420 and takes advantage of the functionality of runtime engine 404 through API 530 is also able to take advantage of the functionality of the dictionaries through the corresponding dictionary APIs produced by generator 514. Just as generic API layer 530 makes leveraging the functionality of runtime engine 404 an intuitive experience from the perspective of the developer within environment 420, the dictionary APIs (518, 520 and 522) makes leveraging the functionality of the runtime dictionaries (408, 410 and 412) a similarly intuitive experience. Thus, generator 514 is provided in order to support the production of a dictionary API layer (518, 520 and 522) that significantly lowers the bar of program integration for an application developer operating from within alternate development environment 420.

Again assuming the .NET/Dexterity example, generator 514 is illustratively configured to generate .NET assemblies 518, 520 and 522 based, for example (but not by limitation), on type information collected from metadata associated with corresponding dictionaries 408, 410 and 412. In one embodiment, the assemblies 518, 520 and 522 expose rich and managed API with compile time type checking and intellisense capabilities accessible from any .NET language. Generator 514 allows for design time assembly generation and, in one embodiment, supports customization (e.g., allows for accessing customized applications via the automatically generated .NET assemblies).

In one embodiment, the generator is configured to produce object-oriented API even though the original dictionary API may not be object-oriented. For example, if a dictionary contains form "sample Form" with two windows A and B each having X and Y fields, then the syntax for subscribing to events on those fields (regardless of the field type) might be something like:

```
Register_Focus_Trigger(field X of window A of
  form  'Sample  Form',  WHEN_VALUE_CHANGES,
  RUN_AFTER_ORIGINAL_HANDLER, <handler_script>)
```

With the API produced by the generator event would illustratively be exposed a field class, the syntax being:

```
SampleForm.A.X.Change        +=       new
  EventHandler(<eventHandlerName>)
```

The dictionary might contain some "objects" and operations on those objects that are not necessarily tied directly to each other. The dictionary API illustratively exposes those constructs together as related.

Metadata from the dictionary that is utilized by the generator illustratively comprises (not by limitation) forms, windows, fields, global variables, functions and procedures, commands (e.g., prescribed actions), menus, etc. The generator illustratively reads this information from the dictionary and generates a corresponding object model (e.g., producing SampleForm class based on 'Sample Form' form definition taken from dictionary). The generator illustratively adds all related sub-objects (e.g., fields, windows, etc.), actions and events to objects being generated.

A simple example would be: the generated SampleForm class contains Open( ) method which would open the form. In scripting language there would be a need to write: open form 'Sample Form' to perform the same action. If the dictionary allows for different naming conventions than the target development environment, then the generator is illustratively configured to perform name translation (e.g., translating 'sample Form' into SampleForm when spaces are not allowed in identifiers within the alternative development environment).

Now that all components of environment 500 have been previewed, it may be helpful to re-visit the .NET/Dexterity example in more detail. The Dexterity tool (interpretive runtime engine 404) includes binaries and application code that resides in one or more dictionaries (dictionaries 408, 410 and 412). A set of API layers (layers identified as 525) are provided to, generally speaking, empower interaction, initiated by an application developer operating from within the .NET Framework (alternate development environment 420), with the Dexterity tool and its related dictionaries.

The set of API layers includes a generic API layer and a dictionary specific layer targeted to an application developer operating from within the .NET framework. The generic API layer (generic API 530) is illustratively a wrapper for the .NET Framework that enables communication with one or more Dexterity dictionaries using, for example, C APIs exposed by the Dexterity tool. However, the generic API layer may not have any information about dictionary types. Thus, generally speaking, the programmer operating in .NET is forced to know the structure of the dictionaries associated with Dexterity (dictionaries 408, 410 and 412) in order to use the generic API layer directly.

The dictionary API layer (APIs 518, 520 and 522), contrary to the generic API layer 530, is an auto-generated (generated by generator 514) assembly. The assembly is based on information taken from, or derived based on, information (e.g., metadata, scripting information, etc.) contained in the dictionaries (408, 410 and 412) associated with the Dexterity tool. The dictionary API layer illustratively exposes dictionary type information as necessary to support the developer operating within the .NET Framework. With the dictionary API layer, the developer can, for example, use intellisense to see all forms, windows and fields for which specific assembly was generated.

The generation tool 514 illustratively allows for seamless integration with the .NET Framework. This integration process can even encompass customized Dexterity dictionaries. After customization (e.g., either by a developer or an application user), the generator is invoked to regenerate compatible .NET assembly.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented application development system, comprising:
    an interpretive runtime engine that is part of a managed code infrastructure, wherein the interpretive runtime engine, utilizes a computer processor that is a component of a computing device to facilitate a presentation of a functioning application to an end user of the functioning application;
    a plurality of dictionaries utilized by the interpretive runtime engine to support the functioning application, the plurality of dictionaries providing business logic for the functioning application, the business logic being separated from said presentation of the functioning application such that changes can be made to the presentation without affecting the business logic;
    a computer-implemented generator that automatically generates a plurality of dictionary application program interfaces based on the plurality of dictionaries, respectively; wherein the plurality of dictionary application program interfaces emulate the plurality of dictionaries in that the application program interfaces are formatted to support integration with a managed code application development environment that is separate and distinct from the interpretive runtime engine, and wherein the computer-implemented generator generates the plurality of dictionary application program interfaces based at least in part on metadata and scripting information provided with the plurality of dictionaries.

2. The system of claim 1, wherein the managed code application development environment is the .NET® Framework.

3. The system of claim 1, further comprising a generic application program interface layer for functionally linking the interpretive runtime engine to the managed code application development environment.

4. The system of claim 3, wherein the generic application program interface layer includes a component that translates an output from the managed code application development environment that is not standard for the interpretive runtime engine into a different corresponding signal that is recognized by the interpretive runtime engine.

5. The system of claim 4, wherein said component of the generic application program interface layer is a data transformation component that performs a data transformation of the output into the different corresponding signal.

6. The system of claim 4, wherein said component of the generic application program interface layer is a parameter marshaling component that performs a parameter marshaling function that transforms the output into the different corresponding signal.

7. The system of claim 4, wherein said component of the generic application program interface layer is a syntax coordination component that performs a syntax coordination function that transforms the output into the different corresponding signal.

8. The system of claim 4, wherein said component of the generic application program interface layer is a semantic coordination component that performs a semantic coordination function that transforms the output into the different corresponding signal.

9. The system of claim 3, wherein the generic application program interface layer includes a component that translates an output from the interpretive runtime engine that is not standard for the managed code application development environment into a corresponding signal that is recognized by the managed code application development environment.

10. A computer-implemented method of generating a plurality of dictionary application program interfaces that emulate a plurality of dictionaries in that the application program interfaces are formatted to support integration with a managed code application development environment that is separate and distinct from an interpretive runtime engine that is part of a managed code infrastructure, the method comprising:

obtaining access to the interpretive runtime engine, wherein the interpretive runtime engine utilizes a computer processor that is a component of a computing device to facilitate a presentation of a functioning application to an end user of the functioning application;

obtaining access to the plurality of dictionaries, the plurality of dictionaries being utilized by the interpretive runtime engine to support the functioning application, and wherein the plurality of dictionaries provide business logic for the functioning application, the business logic being separated from said presentation of the functioning application such that changes can be made to the presentation without affecting the business logic; and utilizing a computer-implemented generator to automatically generate the plurality of dictionary application program interfaces based on said plurality of dictionaries, respectively; wherein the computer-implemented generator generates the dictionary application program interfaces based at least in part on metadata and scripting information provided with the plurality of dictionaries.

11. The method of claim 10, wherein the managed code application development environment is the .NET® Framework.

12. The method of claim 10, further comprising providing a generic application program interface layer that functionally links the interpretive runtime engine to the managed code application development environment.

13. The method of claim 12, wherein providing a generic application program interface layer comprises providing a component of the generic application program interface layer that translates an output from the managed code application development environment that is not standard for the interpretive runtime engine into a different corresponding signal that is recognized by the interpretive runtime engine.

14. The method of claim 13, wherein said component of the generic application program interface layer is a data transformation component that performs a data transformation of the output into the different corresponding signal.

15. The method of claim 13, wherein said component of the generic application program interface layer is a parameter marshaling component that performs a parameter marshaling function that transforms the output into the different corresponding signal.

16. The method of claim 13, wherein said component of the generic application program interface layer is a syntax coordination component that performs a syntax coordination function that transforms the output into the different corresponding signal.

17. The method of claim 13, wherein said component of the generic application program interface layer is a semantic coordination component that performs a semantic coordination function that transforms the output into the different corresponding signal.

18. The method of claim 12, wherein providing a generic application program interface layer comprises providing a component of the generic application program interface layer that translates an output from the interpretive runtime engine that is not standard for the managed code application development environment into a corresponding signal that is recognized by the managed code application development environment.

* * * * *